(12) United States Patent
Jin et al.

(10) Patent No.: US 12,199,943 B2
(45) Date of Patent: *Jan. 14, 2025

(54) DYNAMIC IP ADDRESS CATEGORIZATION SYSTEMS AND METHODS

(71) Applicant: Coupang Corp., Seoul (KR)

(72) Inventors: Xin Jin, Sunnyvale, CA (US); Yonghui Chen, San Diego, CA (US)

(73) Assignee: COUPANG CORP., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,175

(22) Filed: Nov. 23, 2021

(65) Prior Publication Data
US 2022/0086123 A1  Mar. 17, 2022

Related U.S. Application Data

(63) Continuation of application No. 16/522,171, filed on Jul. 25, 2019, now Pat. No. 11,218,443.

(51) Int. Cl.
*H04L 61/00* (2022.01)
*H04L 67/02* (2022.01)
(Continued)

(52) U.S. Cl.
CPC .............. *H04L 61/35* (2013.01); *H04L 67/02* (2013.01); *H04L 67/306* (2013.01); *H04L 67/535* (2022.05); *H04L 2101/695* (2022.05)

(58) Field of Classification Search
CPC ....... H04L 61/35; H04L 67/535; H04L 67/02; H04L 67/306; H04L 2101/695
See application file for complete search history.

(56) References Cited

U.S. PATENT DOCUMENTS 8,082,349 B1   12/2011  Bhargava et al.
9,384,061 B1 *  7/2016  Deivanayagam ..... G06F 9/4881
(Continued)

FOREIGN PATENT DOCUMENTS

CN   102937951 A   2/2013
CN   103812961 A   5/2014
(Continued)

OTHER PUBLICATIONS

Hong Kong Examination Notice dated Jun. 2, 2021, in counterpart Application No. 22020010697.3 (12 pages).
(Continued)

*Primary Examiner* — Joseph L Greene
(74) *Attorney, Agent, or Firm* — FINNEGAN, HENDERSON, FARABOW, GARRETT & DUNNER LLP

(57) ABSTRACT

Methods and systems for dynamic IP categorization include receiving electronic requests to access an electronic server; logging a first set of requests occurring during a first period of time and originating from an IP address belonging to a set of IP addresses; assigning the set of IP addresses to a first category according to the first set of requests; logging a second set of requests occurring during a second period of time and originating from the first IP address or a second IP address belonging to the set of IP addresses; determining a second category according to the second set of requests; assigning the set of IP addresses to the second category when the first category and the second category differ; and providing a response to a requesting IP address based on the category associated with the set of IP addresses to which the requesting IP address belongs.

18 Claims, 5 Drawing Sheets

(51) Int. Cl.
   *H04L 67/306* (2022.01)
   *H04L 67/50* (2022.01)
   *H04L 101/695* (2022.01)

(56) References Cited

U.S. PATENT DOCUMENTS

| | | | |
|---|---|---|---|
| 9,396,316 | B1 | 7/2016 | Altman |
| 9,633,201 | B1 | 4/2017 | Katz |
| 9,742,727 | B1 | 8/2017 | Griggs et al. |
| 10,158,657 | B1* | 12/2018 | Bray .................... H04L 67/535 |
| 10,324,956 | B1 | 6/2019 | Tang |
| 10,497,000 | B1 | 12/2019 | Barstad et al. |
| 10,511,568 | B2 | 12/2019 | Cheng et al. |
| 2005/0018683 | A1 | 1/2005 | Zhao et al. |
| 2006/0095560 | A1 | 5/2006 | Wu et al. |
| 2007/0233671 | A1 | 10/2007 | Oztekin et al. |
| 2008/0140509 | A1 | 6/2008 | Amjadi |
| 2014/0181977 | A1 | 6/2014 | Hammond |
| 2015/0149611 | A1 | 5/2015 | Lissack |
| 2015/0304199 | A1 | 10/2015 | Leask et al. |
| 2016/0117703 | A1* | 4/2016 | Woddi ............... G06Q 30/0204 705/7.33 |
| 2016/0165065 | A1 | 6/2016 | Damstra |
| 2017/0214756 | A1* | 7/2017 | Lipka ..................... H04L 67/02 |
| 2017/0287039 | A1 | 10/2017 | Devageorge et al. |
| 2017/0337790 | A1 | 11/2017 | Gordon-Carroll et al. |
| 2018/0012183 | A1 | 1/2018 | Sou |
| 2018/0192244 | A1 | 7/2018 | Deluca et al. |
| 2019/0130440 | A1* | 5/2019 | Qiu .................... G06Q 30/0248 |
| 2019/0297096 | A1 | 9/2019 | Ahmed et al. |
| 2020/0019644 | A1* | 1/2020 | Mazouchi ............. G06N 20/00 |
| 2020/0356994 | A1* | 11/2020 | Rao .................... H04L 63/1425 |
| 2020/0394703 | A1* | 12/2020 | Potvin .................. H04L 67/306 |

FOREIGN PATENT DOCUMENTS

| | | |
|---|---|---|
| CN | 109257369 A | 1/2019 |
| JP | 2017-058731 A | 3/2017 |
| JP | 2017-220155 A | 12/2017 |
| KR | 10-0952888 | 4/2010 |
| KR | 10-2019-0007898 A | 1/2019 |
| KR | 10-2019-0036662 A | 4/2019 |

OTHER PUBLICATIONS

Japanese Office Action dated Aug. 3, 2021, in counterpart application No. 2020-572921 (8 pages).
$2^{nd}$ Australian Examination Report dated Sep. 16, 2021, in counterpart Application No. 2020264354 (5 pages).
Written Opinion and International Search Report in PCT Application No. PCT/IB2020/056172, mailed Oct. 6, 2020 (9 pages).
Rajeev Agrawal, Ranking Privacy Policy, IEEE, abstract (Year: 2007).
Korean Intellectual Property Office Action in counterpart Application No. 10-2019-0108991 dated Dec. 17, 2020 (13 pages).
Australian Examination Report in counterpart Application No. 2020264354 dated Jan. 21, 2021 (6 pages).
TIPO Office Action and translation in counterpart Application No. 109123352 dated Apr. 14, 2021 (12 pages).
TIPO Search Report and translation in counterpart Application No. 109123352 dated Apr. 14, 2021 (2 page).
Examination Notice dated Nov. 3, 2023, in counterpart Hong Kong Application No. 22020010697.3, (10 pages).

* cited by examiner

IP addresses, binned by purchases

Total value of transactions, binned by transaction amount

DYNAMIC IP ADDRESS CATEGORIZATION SYSTEMS AND METHODS

CROSS-REFERENCE TO RELATED APPLICATION

This application is a continuation of U.S. patent application Ser. No. 16/522,171, filed on Jul. 25, 2019, the disclosure of which is expressly incorporated herein by reference in its entirety.

TECHNICAL FIELD

The present disclosure generally relates to computerized systems and methods for dynamically categorizing Internet Protocol (IP) addresses. In particular, embodiments of the present disclosure relate to systems that categorize sets of IP addresses according to types of requests originating from IP addresses in the set. When a pattern of the requests originating from the set of IP addresses changes, the set of IP addresses are reassigned to a new category. In this way, a server may provide responses tailored to the IP address associated with a request.

BACKGROUND

Website providers often desire to provide tailored responses to users, which enhance user experience and satisfaction with the website. For example, an e-commerce website provider may wish to offer deals to specific users based on past purchases. Furthermore, if a user is identified as conducting fraudulent activities, the website provider may want to prevent the user from causing additional harm.

In order to provide a tailored response, either to enhance user experience or prevent further harmful activities, an identifying characteristic of a user needs to be ascertained. Methods such as web cookies have been used which allow a website provider to identify a web browser based on previous activities. When a web browser on a user device accesses a website, for instance, a web server may cause information to be saved to the user device recording some aspects of the user's interactions with the website or an identification tag so that when the user visits the website in the future, the web server can create a website tailored to the user based in part on the past interactions.

However, users often obscure their identity, intentionally or unintentionally, and prevent identification by the website provider. For example, a user may access a website using multiple electronic devices, such as a laptop, cell phone, and a table. Other times, a user may deliberately obscure his identity by preventing websites from installing web cookies or deleting web cookies before browsing.

Although the user's web browser may vary or be unidentifiable, a website provider may nonetheless provide tailored responses according to the IP address associated with a request to access the website. This may be accomplished, for instance in the present disclosure, by categorizing a set of IP addresses according to the types of activities originating from them. The web server may then tailor a response to an IP address in a set of IP addresses based on the category.

The inventive embodiments of the present disclosure may allow providing a tailored response to a large number of devices and browsers accessing a website from a single IP address, such as a public WiFi access point. It also allows more consistent tailored responses to users, because the IP address associated with a user may be more stable than the browser by which a user accesses the web server.

Furthermore, in the inventive embodiments of the present disclosure, the category associated with a set of IP addresses may be updated dynamically, such that if the types of requests originating from a set of IP addresses change, the category is changed as well. In this manner, a website provider may ensure that accurately tailored responses are provided to users in the event of an IP address change. The website provider may also increase security of the web server by promptly categorizing IP addresses as fraudulent once fraudulent activity is detected and preventing further harm.

SUMMARY

One aspect of the present disclosure is directed to an IP categorization system. The system comprises at least one electronic server, at least one device storing instructions, and at least one processor configured to execute the instructions. The at least one processor executes the instructions to perform operations including: receiving electronic requests to access an electronic server; logging a first set of requests occurring during a first period of time and originating from an IP address belonging to a set of IP addresses; assigning the set of IP addresses to a first category according to the first set of requests; logging a second set of requests occurring during a second period of time and originating from the first IP address or a second IP address belonging to the set of IP addresses; determining a second category according to the second set of requests; assigning the set of IP addresses to the second category when the first category and the second category differ; and providing a response to a requesting IP address based on the category associated with the set of IP addresses to which the requesting IP address belongs.

Another aspect of the present disclosure is directed to an IP categorization method. The method includes the steps of receiving electronic requests to access an electronic server; logging a first set of requests occurring during a first period of time and originating from an IP address belonging to a set of IP addresses; assigning the set of IP addresses to a first category according to the first set of requests; logging a second set of requests occurring during a second period of time and originating from the first IP address or a second IP address belonging to the set of IP addresses; determining a second category according to the second set of requests; assigning the set of IP addresses to the second category when the first category and the second category differ; and providing a response to a requesting IP address based on the category associated with the set of IP addresses to which the requesting IP address belongs.

Another aspect of the present disclosure is directed to an IP categorization system. The system comprises at least one electronic server, at least one device storing instructions, and at least one processor configured to execute the instructions. The at least one processor executes the instructions to perform operations including: receiving electronic requests to access the electronic server; logging a number of orders occurring during a first period of time and originating from an IP address belonging to a set of IP addresses defined by a numerical range of IP addresses; assigning the set of IP addresses to a normal value category if the number of orders is less than a threshold; logging a second number of orders occurring during a second period of time and originating from the first IP address or a second IP address belonging to a set of IP addresses; assigning the set of IP addresses to a high value category when the second number of orders exceeds the threshold; and providing a response comprising discounts to a requesting IP address belonging to the set of IP addresses if the set of IP addresses has been assigned to the high value category.

Other systems, methods, and computer-readable media are also discussed herein.

DETAILED DESCRIPTION

Figure 1:
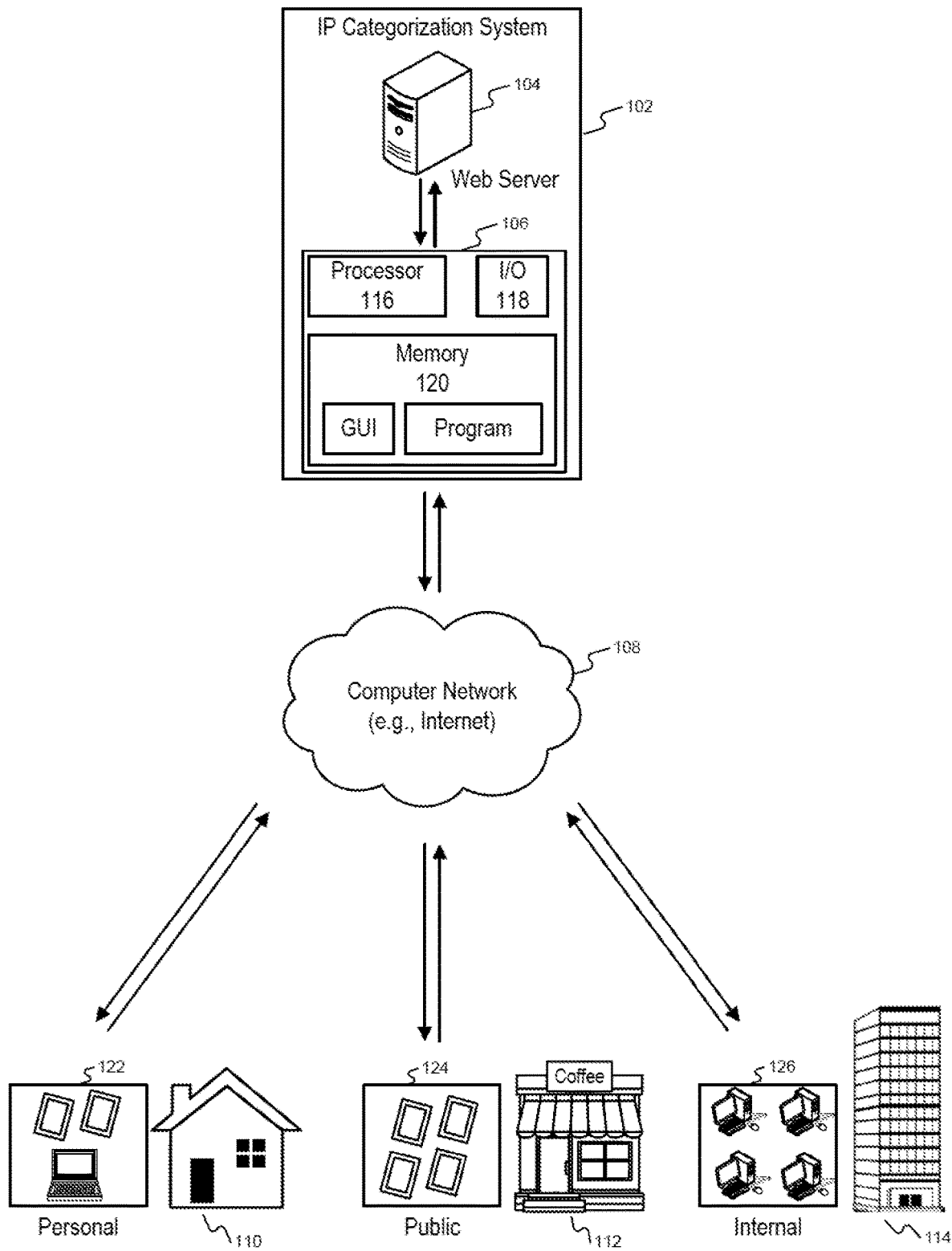
FIG. 1 illustrates a network including an IP categorization system, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for dynamic IP address categorization.

FIG. 1 shows a network including an IP categorization system. The IP categorization system 102 includes a web server 104. The web server 104 contains information, such as HTML code and graphics, to produce a website. The web server 104 is connected to an IP categorization module 106. The IP categorization module 106 includes at least one processor 116, an input/output (I/O) device that allows data to be transmitted 118, and at least one memory 120. The memory 120 stores a program for operating the IP categorization module. The memory 120 may also store instructions for a graphical user interface (GUI).

Furthermore, the processor may be a generic or specific electronic device capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type of circuit capable of data processing. The processor may also be a virtual processor that includes one or more processors distributed across multiple machines or devices coupled via a network.

Additionally, the memory 120 may be a generic or specific electronic device capable of storing codes and data accessible by the processor (e.g., via a bus, not shown). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. The memory may also be a virtual memory that includes one or more memories distributed across multiple machines or devices coupled via a network.

The IP categorization system 102 is connected to a computer network 108. For example, the computer network 108 may include any combination of any number of the Internet, an Intranet, a Local-Area Network (LAN), a Wide-Area Network (WAN), a Metropolitan-Area Network (MAN), a virtual private network (VPN), a wireless network (e.g., compliant with the IEEE 802.11a/b/g/n), a wired network, a leased line, a cellular data network, and a network using Bluetooth connections, infrared connections, or Near-Field Communication (NFC) connections.

In some embodiments, the web server 104 may be directly connected to the computer network 108 and communicate with the IP categorization module 106 via the computer network 108. For example, the web server 104 may receive requests directly from the computer network 108, and forward information about those requests to an IP categorization module 106 via the computer network 106. The IP categorization module may then categorize IP addresses and return information to the web server via the computer network 106. In other embodiments, the web server 104 may be directly connected to the computer network 108, as well as directly connected to the IP categorization module 106, such that information exchanged between the IP categorization module 106 and the web server 104 does not pass over the computer network 106. Alternatively, the web server 104 may be connected to the computer network through the IP categorization module 106, such that requests to access the web server 104 and responses from the web server 104 are routed through the IP categorization module 106 in order to reach the computer network 108. Furthermore, the web server 104 and the IP categorization module may be implemented on a single device that performs IP categorization and web server functions and is connected to the computer network 106. Other arrangements of the web server 104 and IP categorization module 106 are possible in other embodiments, as well.

Furthermore, a personal residence 110 may be connected to the computer network 108. As shown in FIG. 1, the personal residence 108 may be associated with multiple electronic devices 122 for connecting to the network, such as tablets, phones, and laptop computers. A public access point 112 may also be connected to the computer network 108. The public access point may be any location accessible to the public and allowing the public to access the network, for instance, coffee shops, libraries, or gas stations. In some embodiments, public access points may be further categorized as corporate, local business, cloud, etc. The public access point may be associated with many electronic devices 124, some of which may be owned by patrons of the location. Furthermore, an internal facility 114 may be connected to the computer network 108. The internal facility may be, for instance, a headquarters office building of a company that also operates the IP categorization system 102, and may also contain many devices 126 accessing the computer network 108.

Figure 2:
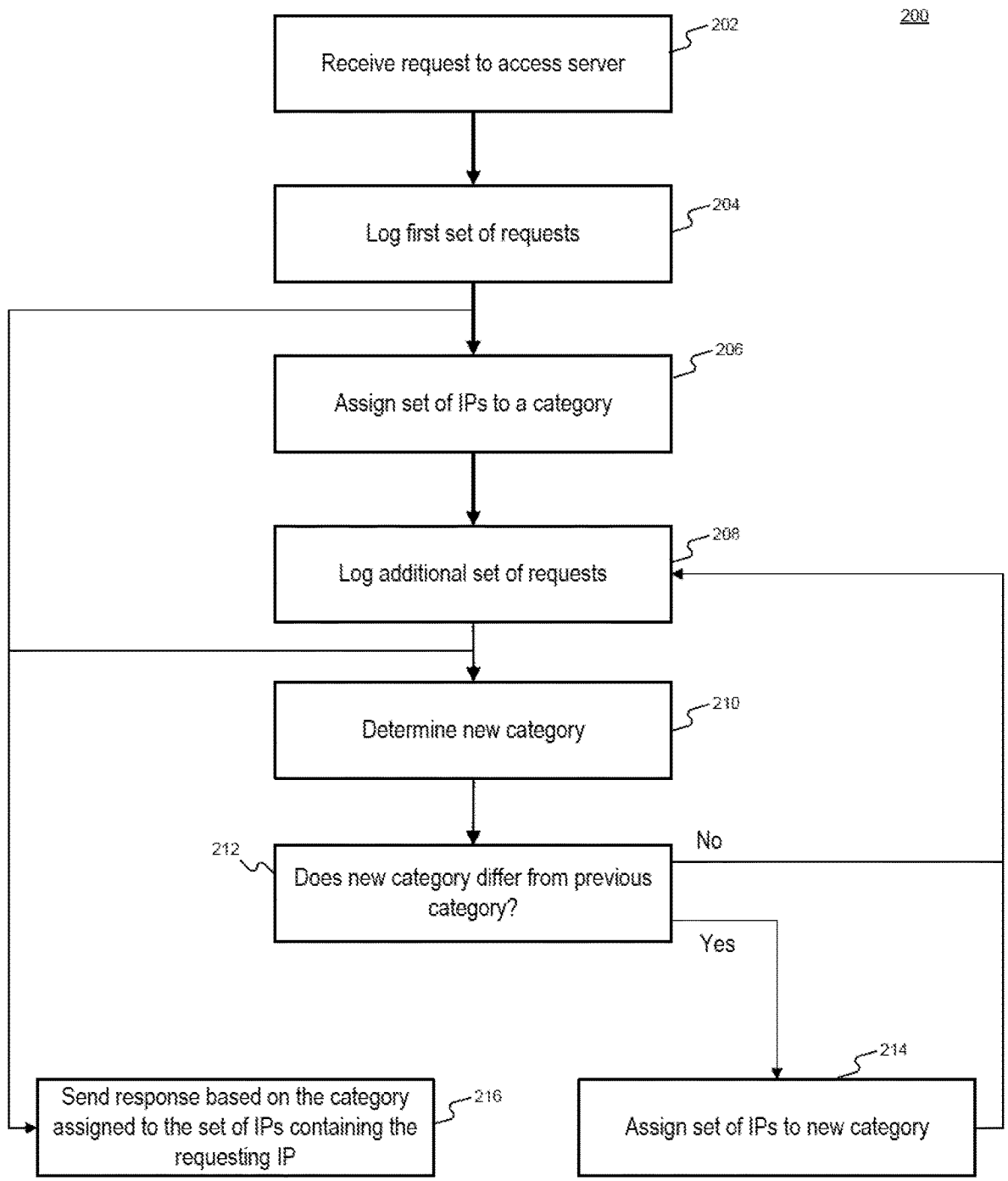
FIG. 2 is a flowchart of an IP categorization method, consistent with the disclosed embodiments.

FIG. 2 shows steps of a dynamic IP categorization process 200. The dynamic IP categorization process may be performed by the IP categorization system 102. For example, instructions for performing the IP categorization method may be stored on the memory 120 and implemented by the processor of the IP categorization system 102. The IP categorization method includes the following steps.

At step 202, IP categorization system 102 may receive a request to access a server. In some embodiments, a plurality of requests may be received at step 202. The request may comprise a request for web page contents hosted by the web server 104. The request may be received from any device connected to the network 108.

At step 204, IP categorization system 102 may log a first set of requests, occurring during a first period of time and originating from an IP address belonging to a set of IP addresses. The set of requests may be maintained by the web server 104 or the IP categorization module 106. Additionally, the first time period may be a set time period, such as one month. The set of requests may include, for example, a number of unique web pages visited, a time spent viewing a web page, a number of requests, a number of unique users, or a number of unique user accounts accessed. For websites having an e-commerce aspect, the set of requests may also include a number of unique accounts having at least one order, a number of orders, or a total sales amount.

Additionally, the set of IP addresses may be defined, for instance, by a numerical range of IP addresses, such as 1.160.10.240 through 1.160.10.255. Furthermore, IP address ranges may also include IPv6 address ranges, such as 2001:db8::2:5 through 2001:db8::2:10. Alternatively, the set may be IP addresses belonging to a geographical area, such as all IP addresses originating in Eritrea, or the set may belong to a particular Internet Service Provider (ISP). In some embodiments, the set of IP addresses may contain a single IP address. There may also be a plurality of sets of IP addresses, and an IP address may belong to multiple sets. For example, IP address 57.8.47.254 may belong to both a set of IP addresses originating in Eritrea (having a range of 57.83.32.0 through 57.83.47.255), as well as a set of IP addresses originating from a particular Eritrean ISP, having, for instance, IP addresses ranging from 57.83.32.350 through 57.83.47.255. Rules for determining which IP addresses belong to a set may be stored in the memory of the IP categorization module.

At step 206, IP categorization system 102 assigns the set of IP addresses to a first category according to the first set of requests. Possible categories may be defined by a descriptor representing values, such as a high value, normal, and fraudulent. In some embodiments, the assignment may be stored in the memory 120. Alternatively, the assignment may be stored in a memory associated with the web server, a database, a storage of the IP categorization system, or other types of computer readable media.

Figure 3A:
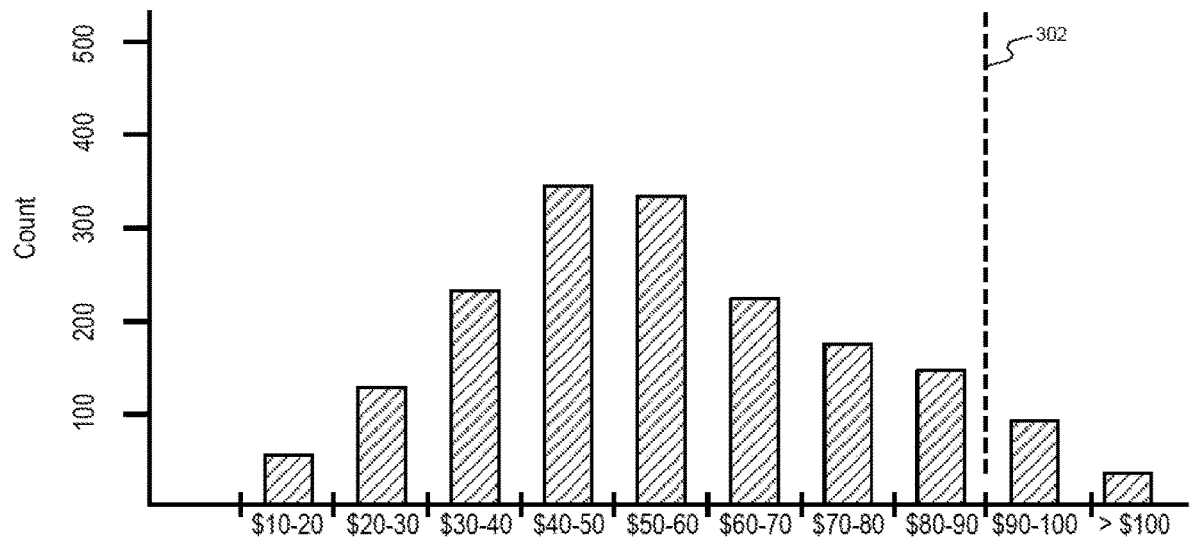
FIGS. 3A and 3B illustrate statistical analysis of purchases and thresholds, consistent with the disclosed embodiments.
Figure 3B:
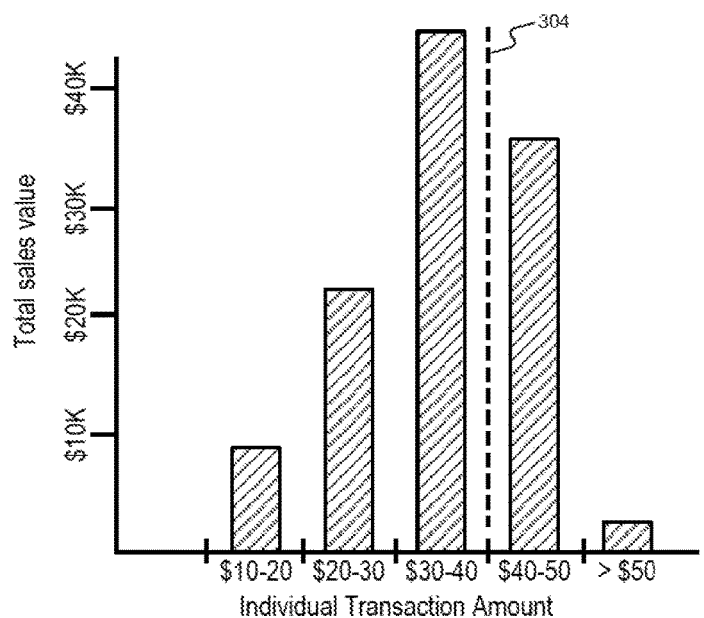

Assignment of sets of IP addresses to categories may be understood by reference to FIGS. 3A and 3B. As shown in FIG. 3A, IP addresses may be analyzed by creating a histogram of purchase amounts. For example, if the web server hosts a website associated with e-commerce, sales data may be obtained of a plurality of sets of IP addresses such that a number of IP addresses from which ranges of purchase amounts originate may be recorded. The IP addresses may be ordered by the sales. For example, using this information, a histogram may be constructed illustrating how many IP addresses are associated with bins of purchases. As shown in the example histogram of FIG. 3A, there may be less than 100 IP addresses associated with purchases between $10 and $20, and approximately 150 IP addresses associated with purchases between $20 and $30. The bins of purchase may be adjusted to better analyze purchase habits on a particular website. Additionally, purchase amounts may represent individual transactions, or may be a total purchase amount over a period of time. Furthermore, the count of each bin may be a sum of individual IP addresses, or a sum of sets of IP addresses.

Once this data has been collected, a top percentile of IP addresses by sales may be set, and a purchase threshold 302 may be set to a sales amount corresponding to the top percentile of IP addresses. For example, the purchase threshold may be calculated so that the highest-spending 10% of IP address sets are above the threshold, and the remaining 90% of IP address sets are below the threshold. For example, if 90% of IP address sets spend less than $90, the threshold may be set to $90, so that the 10% of IP address sets, which are associated with purchases above $90, are above the threshold. When an IP address in a set of IP addresses is associated with requests to make purchases greater than the purchase threshold, the set of IP addresses may be assigned to a category comprising the high value descriptor. If an IP address in the set of IP addresses is associated with purchases less than the purchase threshold, the set of IP addresses may be assigned to a category comprising the normal descriptor.

An alternate way to determine the purchase threshold may be understood by reference to FIG. 3B. In FIG. 3B, total sales values of bins of individual transaction amounts are shown. For example, data may reveal that more than $40,000 in total sales stem from individual transactions totaling between $30 and $40. A purchase threshold 304 may be set so that a sum of transactions greater than the purchase threshold exceeds a desired value. For example, as shown in FIG. 3B, approximately $37,000, or 33% of all sales, originates from purchases greater than $40. If the desired value is $37,000, corresponding to the top 33% of all sales, the purchase threshold may be set to $40. Alternatively, the threshold may be set so any amount of total sales value is above the threshold, such as the top 10% of total sales. Sets of IP addresses may then be assigned to a category comprising the high value descriptor or the normal descriptor as described above.

Furthermore, if an IP address is associated with fraudulent requests, the set of IP addresses to which the IP address belongs may be assigned to a category comprising the fraudulent descriptor. For example, fraudulent requests may include unauthorized access to an account, which may be identified by a user who reports an unauthorized transaction on his account, for instance. Fraudulent requests may also be identified if a number of requests exceed a request limit. The request limit may be a rate, such as number of requests per hour. The request limit may also depend on a number of authenticated users or unique web pages accessed. For instance, the request limit may be 100 requests per hour per authenticated user. If a single IP address is associated with 200 requests in an hour and a single authenticated user, it exceeds the limit and may be categorized as fraudulent. For example, the high request rate may be an attempt to flood the web server with requests and prevent other users accessing a website. However, if those 200 requests in an hour include 100 successful logins, the IP address would be associated with only 2 requests per hour per authenticated user, and would thus be below the threshold and not be assigned to a category comprising the fraudulent descriptor.

Returning to FIG. 2, at step 206, IP categorization system 102 may further assign a category defined by source descriptors, including personal, public, or internal. A set of IP addresses therefore may be assigned to a category according to the type of location associated with the IP address. In this way, a set of IP addresses may be assigned to a category defined by both a value descriptor and a source descriptor, such as a high value-public category, or a low value-personal category. In some embodiments, IP categorization system 102 may assign a set of IP addresses to a category with only a source descriptor, such as internal, or only a value descriptor, such as fraudulent.

For example, a set of IP addresses may be assigned to a category comprising the personal descriptor when a number of unique users is below a user threshold. For example, if an IP address is associated with only two user accounts, browsers, or devices, the IP address is likely to be associated with a residence and used by members of a family. The set of IP addresses may be assigned to a category comprising the public descriptor when the number of unique users is above a threshold. For instance, if an IP address is associated with 50 user accounts, the IP address is likely to be associated with a public location, such as a coffee shop with WiFi accessible to customers. Alternatively, the set of IP addresses may be assigned to a category comprising the internal descriptor when the set is associated with a company owning the website. In this case, a company's range of IP addresses, which may be known to technical support staff, may be categorized as internal, regardless of if the number of unique users is above or below the user threshold. Furthermore, the user threshold may be determined by a statistical analysis of unique users per IP address. For example, there may be a high number of IP addresses associated with small numbers of users, and a small number of IP addresses associated with high numbers of users. Statistical analysis may reveal that, for instance, the average number of users per IP address is five, and the threshold may be set to five such that IP addresses with less than five users are categorized as personal and IP addresses with more than five users are categorized as public.

In some embodiments, step 206 may include determining a physical address associated with an IP address in the set of IP addresses. This may be accomplished by accessing an IP address registry. If the IP address is associated with a physical address of a business, the set of IP addresses is assigned to a category comprising the public descriptor. Alternatively, if the IP address is associated with the physical address of a residence, the set of IP addresses is assigned to a category comprising the personal descriptor.

Furthermore, step 206 may include assigning the set of IP addresses to a first category before the end of the first time period if the first set of requests comprise a trigger event. Trigger events may only include requests made from IP addresses not assigned to a category comprising the internal descriptor, such that network tests or administrator accesses are not considered trigger events. For example, a trigger event may be when a request for a high value purchase, such as a single purchase with a value above the purchase threshold. In this case, the set of IP addresses may be assigned to a category comprising the high value descriptor before the first time period ends. Additionally, a trigger event may occur when a request to access a user account is made from an IP address in a set of IP addresses not previously associated with the user account. In this case, the set of IP addresses may be categorized as fraudulent. Alternatively, a trigger even may be when a request to access an internal company account is made from an IP address not previously categorized as internal. This may indicate that a hacker is attempting to access an internal network, and the IP address may be assigned to a category comprising the fraudulent descriptor. By assigning a category upon the occurrence of a trigger event, step 206 may allow for prompt and dynamic categorization of IP addresses according to certain high-priority events that typify a category, rather than waiting to categorize a set of IP addresses.

Figure 4:
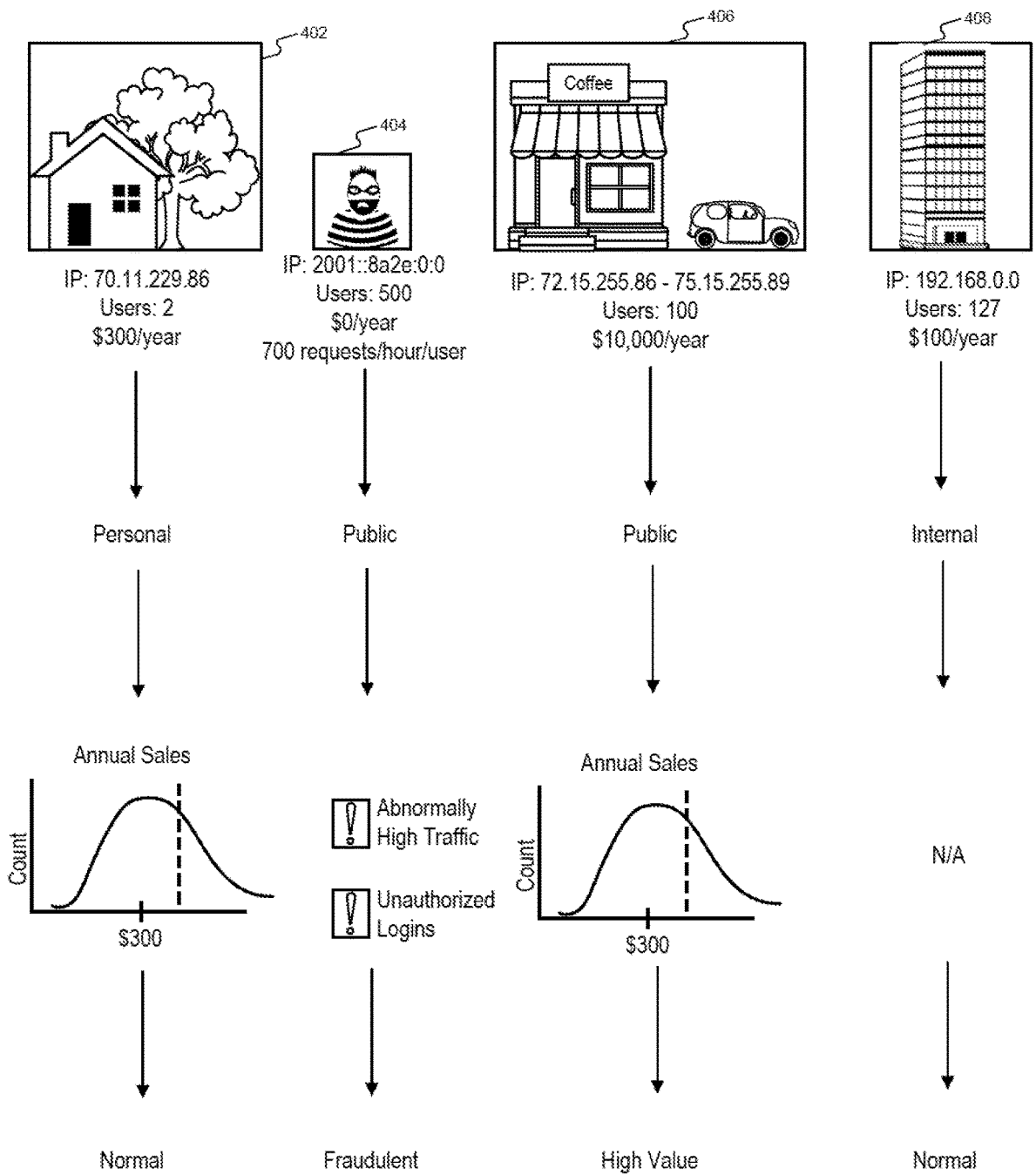
FIG. 4 is a sample categorization of multiple sets of IP addresses, consistent with the disclosed embodiments.

Step 206 maybe further understood by reference to the examples provided in FIG. 4. In these examples, the user threshold is five, and the purchase threshold is $400 per year. Location 402 is a residence having two users, one IP address, and purchasing $300 per year from a website operated by the web server 104. The IP address of location 402 is assigned to a category comprising personal descriptor because the number of users is less than the user threshold. The IP address is also assigned to a category comprising the normal value descriptor, because the purchases from location 402 are less than the purchase threshold. Thus, the final category of location 402 is normal-personal.

Continuing, location 404 is associated with 500 users and a single IP address. Location 404 also produces no sales in a year. Location 404 may be assigned to a category comprising the public descriptor because there are more users than the user threshold. However, location 404 is also associated with 700 requests per hour per user, greater than the request limit of 100 requests per hour per user, and has a history of being associated with unauthorized login attempts. As a result, the IP associated with location 404 is assigned to a category comprising the fraudulent descriptor. The final category of location 404 is fraudulent-public.

Location 406 is associated with 100 users, and has a range of IP addresses making up a set of IP addresses. The set is also associated with $10,000 of sales per year. Because location 406 has more users than the user threshold, the set is assigned to a category comprising the public descriptor. Additionally, because the annual sales are greater than the purchase threshold, the set is assigned to a category also comprising the high value descriptor. The final category of location 406 is high value-public.

Location 408 is also associated with 100 users and a single IP address, but only produces $100 of sales per year. The IP address is also known to be assigned to the company headquarters. As a result, it is assigned to a category comprising the internal descriptor. Furthermore, because there are no sales associated with location 408, it may not be assigned to a category comprising a value descriptor. The final category of location 408 is internal.

Returning to FIG. 2 and process 200, after IP categorization system 102 assigns the set of IP addresses to a category at step 206, IP categorization system 102 logs a second or additional set of requests occurring during a second time period and originating from the first IP address or a second IP address belonging to the set of IP addresses at step 208. The second set of requests may be logged in a similar manner to the first set of requests logged in step 204. The second period of time may be the same duration as the first period of time, or a different duration. Furthermore, the second set of requests may include requests to access the same server as in step 202 or a second electronic server.

At step 210, IP categorization system 102 determines a new, second category on the basis of the second set of requests. The second category may be determined using the same techniques used to determine the first category, such as a purchase threshold, user threshold, request limit, and trigger event. The second category may also be determined before the end of the second period, in the case of a trigger event, or after the second period expires.

At step 212, IP categorization system 102 determines if the new category differs from the previous category. If so, step 212 is Yes, and the process proceeds to assign the set of IP addresses to the new category, followed by returning to step 208 and logging an additional set of requests. If the new and previous categories are the same, for example, the first and second categories are the same, then step 212 is No, and the process returns directly to step 208 to log an additional set of requests. In this way, the category to which a set of IP addresses is assigned may be continually updated over an indefinite number of time periods so that the category is always current. The category may also be updated dynamically in response to certain high priority events. The category of a set of IP addresses may also be updated to a status not dependent upon a high priority event if the additional set of requests logged at step 208 after a trigger event indicates that the category assigned due to the trigger event is no longer applicable to the set of IP addresses. For example, if a hacker accesses an internal account from a public WiFi access point, the WiFi access point may be promptly assigned to a category comprising the fraudulent descriptor to protect the network. If the hacker then leaves the public WiFi access point, and the additional set of requests show no more fraudulent activity, the set of IP addresses at the public WiFi access point may be returned to a category comprising the normal value descriptor rather than remaining assigned to a fraudulent category. In some embodiments, the second time period may depend on the type of change and the previous category. Continuing the example above, the second time period may be very short so that the public IP address is not blocked for a long time, which would have the adverse effect of interrupting website access for many users. Alternatively, if the previous category comprised the personal descriptor, the second time period may be long, since the adverse effect of interrupting access for a few users is less than the benefit of ensuring website security.

At step 216, IP categorization system 102 provides a response to a requesting IP address based on the category associated with the set of IP addresses to which the requesting IP address belongs. Step 216 may occur concurrently with steps 204 and 208. That is, while the process is logging sets of requests at step 204 or at step 208, the process may also provide responses to requesting IP addresses such that the web server does not stop performing web serving functions while the sets of requests are being logged.

For example, if the set of IP addresses to which the requesting IP address belongs is assigned to a category comprising the high value descriptor, the response provided at step 216 may include a discount, an offer, or services. These may be special options reserved only for IP addresses assigned to a category comprising the high value descriptor and not provided to IP addresses assigned to a category comprising the normal value descriptor. Discounts may include special sales, and offers may include unique products or opportunities. Additionally, the services may include special customer support. For instance, if a user associated with an IP address assigned to a category comprising the high value descriptor needs customer support, a customer support service ticket may be instantiated and assigned a priority higher than priority assigned to tickets associated with sets of IP addresses assigned to a category comprising the normal descriptor. Furthermore, resources, such as internet bandwidth, processor time, memory, and technical support staff may be allocated proportional to the priority of the customer support service ticket. These resources may then be used to provide improved support to a customer associated with the requesting IP address.

Alternatively, if the requesting IP address is in a set of IP addresses assigned to a category comprising the fraudulent descriptor, the response provided at step 216 may include blocking access to the website. For example, if it is determined that a request from the requesting IP address comprises an attempt to log into a user account, and the requesting IP address has been assigned to a category comprising fraudulent descriptor, a notification may be sent to an owner of the user account notifying the owner of the potentially fraudulent attempt. The notification may be sent via email, phone call, text message, or an in-app notification.

Figure 5:
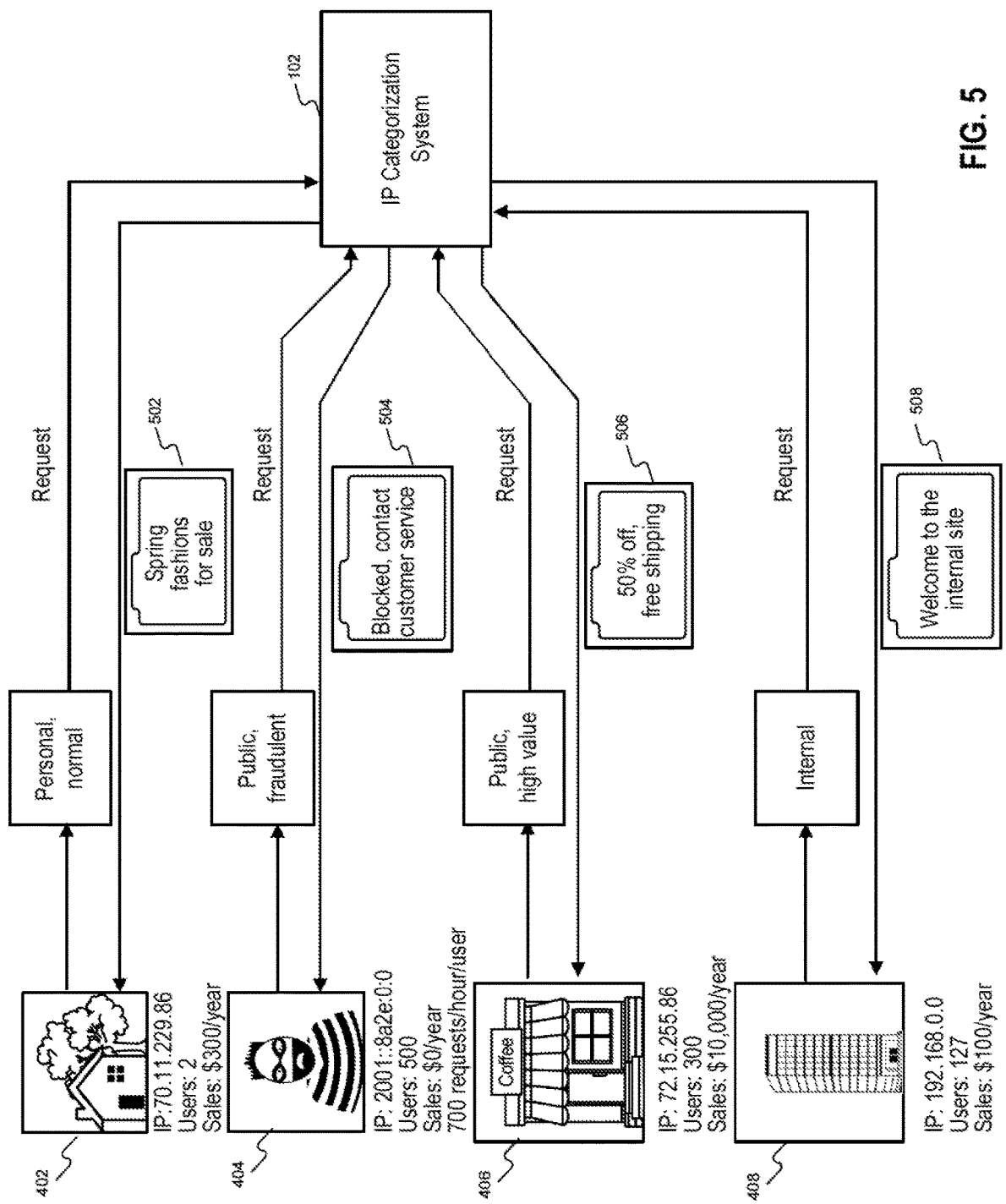
FIG. 5 illustrates responses to requesting IP addresses based on the category associated with the set of IP addresses to which the requesting IP address belongs, consistent with the disclosed embodiments.

Step 216 may be further understood by reference to the examples illustrated in FIG. 5. When location 402, having an IP address assigned to the normal value-personal category, makes a request, the IP categorization system provides a response 502 provided to other normal value users. In this example, the response 502 includes a website showing spring fashions. However, requests made from location 404, having an IP address assigned to the public-fraudulent category, are provided a response 504 showing that the website has been blocked for this IP address and instructing the user to contact customer service. Requests from location 406, with an IP address assigned to the high value-public category, are provided a response 506 offering 50% off and free shipping. In this way, a company may target promotions and induce additional sales from IP addresses known to already produce large sales amounts. Finally, requests from location 408 are provided a response 508 including access to an internal company site with, for instance, company newsletters, pay databases, performance evaluations, assignments, and administrative accesses.

In some embodiments, process 200 may include steps of transferring a log of the first set of requests. The log may be analyzed and a corresponding category determined. The category may then be transferred. A second set of activities may also be logged, and the log transferred and analyzed as well. A second category may then be transferred. For example, a web server 104 may received a requests and produce the first and second logs. These requests may then be transferred over the network 108 to the IP categorization module 106. The module may, based on the log, determine a category and return the category via the network 108 to the web server 104. The web server 104 may then provide responses to requests from an IP address based on a category provided by the IP categorization module. In some embodiments, the logs and categories may be transferred between a web server and an IP categorization module via an Application Programming Interface (API). The API may be hosted by the IP categorization module and accessed via the internet.

As an exemplary embodiment of the present disclosure, an IP categorization system may comprise at least one electronic server, at least one electronic server; at least one device storing instructions; and at least one processor configured to execute the instructions to perform operations. The operations include receiving electronic requests to access the electronic server and logging a number of orders occurring during a first period of time and originating from an IP address belonging to a set of IP addresses defined by a numerical range of IP addresses. The system then assigns the set of IP addresses to a normal value category if the number of orders is less than a threshold. The system also logs a second number of orders occurring during a second period of time and originating from the first IP address or a second IP address belonging to a set of IP addresses, and assigns the set of IP addresses to a high value category when the second number of orders exceeds the threshold. The system also provides a response including discounts to a requesting IP address belonging to the set of IP addresses if the set of IP addresses has been assigned to the high value category.

To further illustrate the system, the set of IP addresses may be defined by IP addresses in a range from 2.20.253.0 through 2.20.255.255. On May 1, a purchase of $50 is made originating from the IP address 2.20.254.0. Since the threshold is set to $500 per day, the set of IP addresses is assigned to the normal value category. Later, on May 10, a purchase of $1787, exceeding the threshold, is made originating from the IP address 2.20.254.253. The set of IP addresses is assigned to the high value category as a result. Subsequently, when IP address 2.20.255.254 requests the website, a discount of 50% off an entire purchase price is offered. In this way, a website owner may benefit by targeting users visiting the website based on the IP address.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An IP categorization system comprising:
a memory storing instructions; and
at least one processor configured to execute the instructions to:
log a first set of requests occurring during a first time period and originating from a first IP address belonging to a set of IP addresses;
assign the set of IP addresses to a first category according to the first set of requests, the first category comprising both: a first value descriptor and a first source descriptor;
log a second set of requests occurring during a second time period and originating from the first IP addresses or a second IP address belonging to the set of IP addresses;
determine a second category according to the second set of requests, the second category comprising both: a fraudulent descriptor and a second source descriptor, wherein determining the second category occurs upon determining a number of access requests exceeds a limit, wherein the limit is based on a frequency of access requests with respect to a total number of authenticated users associated with the first IP address; and
reassign the set of IP addresses to the second category when the first category and the second category differ,
wherein assigning the set of IP addresses comprises assigning the set of IP addresses based on at least one of:
whether a purchase value associated with the set of IP addresses exceeds a threshold;
a number of unique users associated with the set of IP addresses;
a network location of a device associated with at least one request of the first or second set;
at least one request of the first or second set requesting unauthorized access to an account;
a number of requests exceeding a request limit; or
historical data associated with the first or second IP address;
assigning the set of IP addresses to a category comprising a personal descriptor when a number of unique users is below a user threshold;
assigning the set of IP addresses to a category comprising a public descriptor when the number of unique users is above the user threshold; and
assigning the set of IP addresses to a category comprising an internal descriptor when the set of IP addresses is associated with a company owning a website from which at least one of the first set of requests or the second set of requests is requesting web page contents.

2. The IP categorization system of claim 1, wherein:
the first value descriptor comprises high, normal, or fraudulent; and
the first source descriptor comprises personal, public or internal.

3. The IP categorization system of claim 1, wherein at least one of the first set of requests or the second set of requests comprises a request for web page contents hosted by a web server.

4. The IP categorization system of claim 1, wherein assigning the set of IP addresses is based on at least two of:
whether the purchase value associated with the set of IP addresses exceeds the threshold;
the number of unique users associated with the set of IP addresses;

the network location of the device associated with at least one request of the first or second set;
at least one request of the first or second set requesting unauthorized access to the account;
the number of requests exceeding the request limit; or
the historical data associated with the first or second IP address.

5. The IP categorization system of claim 1, wherein assigning the set of IP addresses is based on:
whether the purchase value associated with the set of IP addresses exceeds the threshold; and
the number of unique users associated with the set of IP addresses.

6. The IP categorization system of claim 1, wherein logging a first set of requests and logging the second set of requests are performed concurrently while providing at least one response to at least one of the first set of requests or the second set of requests.

7. The IP categorization system of claim 1, wherein:
assigning the set of IP addresses is based on whether the purchase value associated with the set of IP addresses exceeds a threshold; and
the threshold is determined by:
obtaining sales data of a plurality of sets of other IP addresses;
ordering the other IP addresses by sales;
setting a top percentile of the other IP addresses by sales; and
setting the threshold to a sales amount corresponding to the top percentile of the other IP addresses.

8. The IP categorization system of claim 1, wherein:
assigning the set of IP addresses is based on whether the purchase value associated with the set of IP addresses exceeds a threshold; and
the threshold is determined by:
obtaining the transaction amounts of a plurality of purchases; and
setting the threshold so that a sum of transactions greater than the threshold exceed a desired value.

9. The IP categorization system of claim 1, wherein assigning the set of IP addresses comprises:
determining a physical address associated with an IP address in the set of IP addresses;
identifying the physical address as a business or a residential address;
assigning the set of IP addresses to a category comprising a personal descriptor when the physical address is a residential address; and
assigning the set of IP addresses to a category comprising a public descriptor when the physical address is a business address.

10. The IP categorization system of claim 1, wherein when the requesting IP address is in a set of IP addresses assigned to a category comprising the high value descriptor, a response is provided comprising at least one of discounts, offers, or services.

11. The IP categorization system of claim 1, wherein assigning the set of IP addresses is based on whether the purchase value associated with the set of IP addresses exceeds the threshold, the threshold being a per-year purchase value.

12. An IP categorization method comprising:
logging a first set of requests occurring during a first time period and originating from a first IP address belonging to a set of IP addresses;
assigning the set of IP addresses to a first category according to the first set of requests, the first category comprising both: a first value descriptor and a first source descriptor;
logging a second set of requests occurring during a second time period and originating from the first IP addresses or a second IP address belonging to the set of IP addresses;
determining a second category according to the second set of requests, the second category comprising both: a fraudulent descriptor and a second source descriptor, wherein determining the second category occurs upon determining a number of access requests exceeds a limit, wherein the limit is based on a frequency of access requests with respect to a total number of authenticated users associated with the first IP address; and
reassigning the set of IP addresses to the second category when the first category and the second category differ,
wherein assigning the set of IP addresses comprises assigning the set of IP addresses based on at least one of:
whether a purchase value associated with the set of IP addresses exceeds a threshold;
a number of unique users associated with the set of IP addresses;
a network location of a device associated with at least one request of the first or second set;
at least one request of the first or second set requesting unauthorized access to an account;
a number of requests exceeding a request limit; or
historical data associated with the first or second IP address;
assigning the set of IP addresses to a category comprising a personal descriptor when a number of unique users is below a user threshold;
assigning the set of IP addresses to a category comprising a public descriptor when the number of unique users is above the user threshold; and
assigning the set of IP addresses to a category comprising an internal descriptor when the set of IP addresses is associated with a company owning a website from which at least one of the first set of requests or the second set of requests is requesting web page contents.

13. The IP categorization method of claim 12, wherein at least one of the first set of requests or the second set of requests comprises a request for web page contents hosted by a web server.

14. The IP categorization method of claim 12, wherein assigning the set of IP addresses is based on at least two of:
whether the purchase value associated with the set of IP addresses exceeds the threshold;
the number of unique users associated with the set of IP addresses;
the network location of the device associated with at least one request of the first or second set;
at least one request of the first or second set requesting unauthorized access to the account;
the number of requests exceeding the request limit; or
the historical data associated with the first or second IP address.

15. The IP categorization method of claim 12, wherein assigning the set of IP addresses is based on:
whether the purchase value associated with the set of IP addresses exceeds the threshold; and
the number of unique users associated with the set of IP addresses.

16. The IP categorization method of claim 12, wherein assigning the set of IP addresses comprises:
- determining a physical address associated with an IP address in the set of IP addresses;
- identifying the physical address as a business or a residential address;
- assigning the set of IP addresses to a category comprising a personal descriptor when the physical address is a residential address; and
- assigning the set of IP addresses to a category comprising a public descriptor when the physical address is a business address.

17. The IP categorization system of claim 1, further comprising providing a response to a requesting IP address indicating a website has been blocked based on the requesting IP address being assigned to the second category.

18. The IP categorization system of claim 1, wherein the second source descriptor comprises personal, public or internal.

\* \* \* \* \*